(12) United States Patent
Kelly et al.

(10) Patent No.: US 10,752,338 B2
(45) Date of Patent: Aug. 25, 2020

(54) AIRCRAFT WING WITH AILERON

(71) Applicant: AIRBUS OPERATIONS LIMITED, Bristol (GB)

(72) Inventors: Mark Shaun Kelly, Bristol (GB); Stuart Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 281 days.

(21) Appl. No.: 15/730,285

(22) Filed: Oct. 11, 2017

(65) Prior Publication Data
US 2018/0099735 A1 Apr. 12, 2018

(30) Foreign Application Priority Data
Oct. 12, 2016 (GB) .................................. 1617308.0

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05); *Y02T 50/164* (2013.01)

(58) Field of Classification Search
CPC ......... B64C 3/56; B64C 3/546; B64C 23/072; B64C 2009/05; B64C 9/22; B64C 9/02;
(Continued)

(56) References Cited

U.S. PATENT DOCUMENTS

| 1,710,673 A | * | 4/1929 | Bonney | ................... B64C 3/44 244/215 |
| 2,280,809 A | * | 4/1942 | Evans | ................... B64C 3/56 116/285 |

(Continued)

FOREIGN PATENT DOCUMENTS

| DE | 20 2012 002 172 | 5/2012 |
| WO | WO 2015/150835 | 10/2015 |

OTHER PUBLICATIONS

Combined Search and Examination Report for GB1617308.0, dated Mar. 28, 2017, 7 pages.
(Continued)

*Primary Examiner* — Medhat Badawi
*Assistant Examiner* — Vicente Rodriguez
(74) *Attorney, Agent, or Firm* — Nixon & Vanderhye (57) ABSTRACT

An aircraft wing having a fixed wing with a wing tip device. The wing tip device is movable between a flight configuration for use during flight, and a ground configuration for use during ground-based operations. The wing has a master flight control surface associated with the fixed wing and a slave flight control surface associated with the wing tip device. An interface between the master flight control surface and the slave flight control surface is arranged to provide a rigid connection between the master flight control surface and slave flight control surface when the wing tip device is in the flight configuration. Moving the master control surface about a control axis causes the slave control surface to be moved about the control axis. The interface is arranged to de-couple the slave and master control surfaces when the wing tip device is moved from the flight configuration into the ground configuration.

20 Claims, 9 Drawing Sheets

(58) Field of Classification Search
CPC .. B64C 9/10; B64C 3/00; B64C 37/00; Y02T 50/164; F42B 10/14
See application file for complete search history.

(56) References Cited

U.S. PATENT DOCUMENTS

| | | | |
|---|---|---|---|
| 2,418,301 A | | 4/1947 | Heal |
| 2,468,425 A | * | 4/1949 | Carpenter ................. B64C 3/56 74/520 |
| 2,712,421 A | * | 7/1955 | Naumann ................. B64C 3/56 244/49 |
| 2,961,196 A | * | 11/1960 | Atkinson ................. B64C 3/40 244/46 |
| 3,063,660 A | | 11/1962 | Jarrell |
| 4,778,129 A | | 10/1988 | Byford |
| 4,779,820 A | * | 10/1988 | Lambert ................. B64C 3/56 244/49 |
| 8,651,431 B1 | | 2/2014 | White et al. |
| 8,708,286 B2 | * | 4/2014 | Sakurai ..................... B64C 3/56 244/201 |
| 2015/0336657 A1 | * | 11/2015 | Townsend ................. B64C 3/56 244/49 |
| 2016/0090170 A1 | * | 3/2016 | Thompson ......... B64D 45/0005 701/3 |
| 2017/0029089 A1 | * | 2/2017 | Alexander ................ B64C 3/40 |

OTHER PUBLICATIONS

European Search Report cited in EP 17188966.0 dated Mar. 14, 2018, 4 pages.

* cited by examiner

AIRCRAFT WING WITH AILERON

RELATED APPLICATION

This application claims priority to United Kingdom (GB) 1617308.0 filed Oct. 12, 2016, the entire contents of which is incorporated by reference.

BACKGROUND OF THE INVENTION

The present invention concerns an aircraft wing comprising a flight control surface, for example, an aileron. More particularly, but not exclusively, this invention concerns an aircraft wing comprising an aileron and a wing tip device.

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage). To address this problem, various arrangements comprising moveable wing tip devices, that specifically enable the span to be reduced in a ground configuration, have been suggested. For example, WO2015/150835 is an example with a wing tip device and fixed wing being separated along an oblique cut plane, with the wing tip device being rotatable about an axis or rotation perpendicular to that cut plane.

However, the use of such wing tip devices has meant that ailerons, which are typically located towards the end of a wing, have to be moved inboard on the wing, or reduced in length, as the presence of a junction between the movable wing tip device and fixed wing means conventional ailerons would not be operable. This reduces the effectiveness of the ailerons.

The present invention seeks to mitigate the above-mentioned problems. Alternatively or additionally, the present invention seeks to provide an improved aircraft wing.

SUMMARY OF THE INVENTION

The present invention provides according to a first aspect, an aircraft wing, the aircraft wing comprising a fixed wing with a wing tip device at the tip of the fixed wing, wherein the wing tip device is movable between: a flight configuration for use during flight, and a ground configuration for use during ground-based operations, in which ground configuration the wing tip device is moved away from the flight configuration such that the span of the aircraft wing is reduced, the wing further comprising a master flight control surface associated with the fixed wing and a slave flight control surface associated with the wing tip device, with an interface between the master flight control surface and the slave flight control surface, wherein the interface is arranged to provide a rigid connection between the master flight control surface and slave flight control surface when the wing tip device is in the flight configuration and the master control surface is moved about a control axis common to both flight control surfaces, such that the slave control surface is also caused to be moved about the control axis, and wherein the interface is further arranged to de-couple the slave control surface from the master control surface when the wing tip device is moved from the flight configuration into the ground configuration.

The flight control surfaces may be located at the trailing edge of the wing. The flight control surfaces may be ailerons.

The flight control surfaces may be located at the leading edge of the wing. The flight control surfaces may be slats or flaps The interface between the master flight control surface and slave flight control surface may be a passive interface. Where the term "passive interface" is used, it is intended to refer to an interface which does not require any dedicated and/or active actuation to engage/disengage. For example, the interface may be engaged simply by moving the wing tip device into the flight configuration, and disengaged by moving the wing tip device into the ground configuration.

The interface may be formed by a series of grooves, protrusions, or formations on the master flight control surface and slave flight control surface inter-engaging when the wing tip device is in the flight configuration. The interface may form an interlock when the wing tip device is in the flight configuration. Movement of the wing tip device from the flight configuration to the ground configuration may result in the series of grooves, protrusions, or formations disengaging. Movement of the wing tip device from the flight configuration to the ground configuration may disengage the interlock.

The fixed wing may comprise one or more actuators associated with the master flight control surface. The one or more actuators may control the movement of the master flight control surface. The interface between the master flight control surface and the slave flight control surface, when the wing tip device is in the flight configuration, may be arranged such that movement of the master flight control surface drives movement of the slave flight control surface. In such an arrangement, there is no need to provide independent actuation of the slave flight control surface. This may simplify the construction of the wing.

Where the term fixed wing has been used, it will be appreciated by the skilled person that this is the section of the wing which is intended to be fixed in relation the aircraft fuselage when an aircraft is constructed using the aircraft wing.

The wing tip device and the fixed wing may be separated along an oblique cut plane passing through the upper and lower surfaces of the wing, the oblique cut plane being orientated normal to the axis of rotation of the wing tip device. The oblique plane and the axis of rotation may be such that the fixed wing and the wing tip device do not clash when rotating between the flight and ground configurations. An example of a wing tip device that is rotatable in this manner is shown in WO 2015/150835.

The orientation of the rotation axis is preferably such that when the wing tip device is rotated about the axis, from the flight configuration to the ground configuration, the span of the aircraft wing is reduced.

The cut plane may be oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing. The distance, along the leading edge of edge of the wing, from the root of the wing to where the cut plane intersects the leading edge, may be greater than the distance, along the trailing edge of the wing, from the root of the wing to where the cut plane intersects the trailing edge. Alternatively, the distance, along the trailing edge of the wing, from the root of the wing to where the cut plane intersects the trailing edge, may be greater than the distance, along the leading edge of the wing, from the root of the wing to where the cut plane intersects the leading edge.

The interface between the master flight control surface and slave flight control surface may be located in the same plane as the oblique cut plane. The interface may be configured such that rotation of the wing tip device between the flight configuration and ground configuration, such that the wing tip device rotates around an axis perpendicular to the oblique cut plane, may de-couple the interface. Rotation of the wing tip device between the ground configuration and the flight configuration may couple the interface between the wing tip device and the fixed wing. The flight control axis, around which the master flight control surface and slave flight control surface may be rotated when the wing tip device is in the flight configuration, and the rotation axis of the wing tip device, may be arranged to be neither coaxial nor parallel. That the rotational axis and the flight control axis are in different directions allows there to be a rigid connection between the wing tip device and fixed wing with respect to movement in a first direction (around the flight control axis), and also allows de-coupling of the interface between the wing tip device and fixed wing in a second direction (the rotational axis).

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation of the wing tip device may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device is preferably rotatable about a single axis of rotation. For example, the rotation of the wing tip device is preferably not the result of a compound rotation (I.e. a net rotation created by a plurality of separate rotations about separate axes).

The angle is preferably an oblique angle. The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

The oblique cut plane may be a primary cut plane. When the wing tip device is in the flight configuration, the outer end of the fixed wing and the inner end of the wing tip device may meet along an interfacing cut line that separates the outer surfaces of the fixed wing and the wing tip device. The interfacing cut line may comprise: (i) a first length, formed by a cut through the outer surface in a first plane that is parallel to the primary cut plane but offset from the primary cut plane in a first direction; (ii) a second length, formed by a cut through the outer surface in a second plane that is parallel to the primary cut plane but offset from the primary cut plane in a second direction, opposite to the first direction; and (iii) a transition section over which the interfacing cut line transitions from the first length to the second length. The interfacing cut line may be arranged such that when the wing tip device rotates from the flight configuration to the ground configuration, the wing tip device contacts the fixed wing at a sliding contact along the transition section, but the wing tip device separates away from the fixed wing along the first length and second length. Embodiments have been found to be especially beneficial in such an arrangement because a thin skin in the vicinity of the interface tends to be especially important.

Alternative arrangements between the fixed wing and the wing tip device include folding wing tip devices which may be actuated around a fold line between the flight configuration and ground configuration. Yet another arrangement includes wing tip devices which pivot around a pivot point between the flight configuration and ground configuration. The movement of the wing tip device around the pivot may be towards the front or rear of the aircraft.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention there is also provided an aircraft, the aircraft comprising a wing according to the first aspect of the invention.

According to a third aspect, there is a method of decoupling an interface between a master flight control surface and slave flight control surface of a wing according to the first aspect of the invention, the method comprising the step of moving the wing tip device from the flight configuration to the ground configuration.

According to a fourth aspect, there is a method of coupling an interface between a master flight control surface and a slave flight control surface of a wing according to the first aspect of the invention, the method comprising the step of moving the wing tip device from the ground configuration to the flight configuration.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
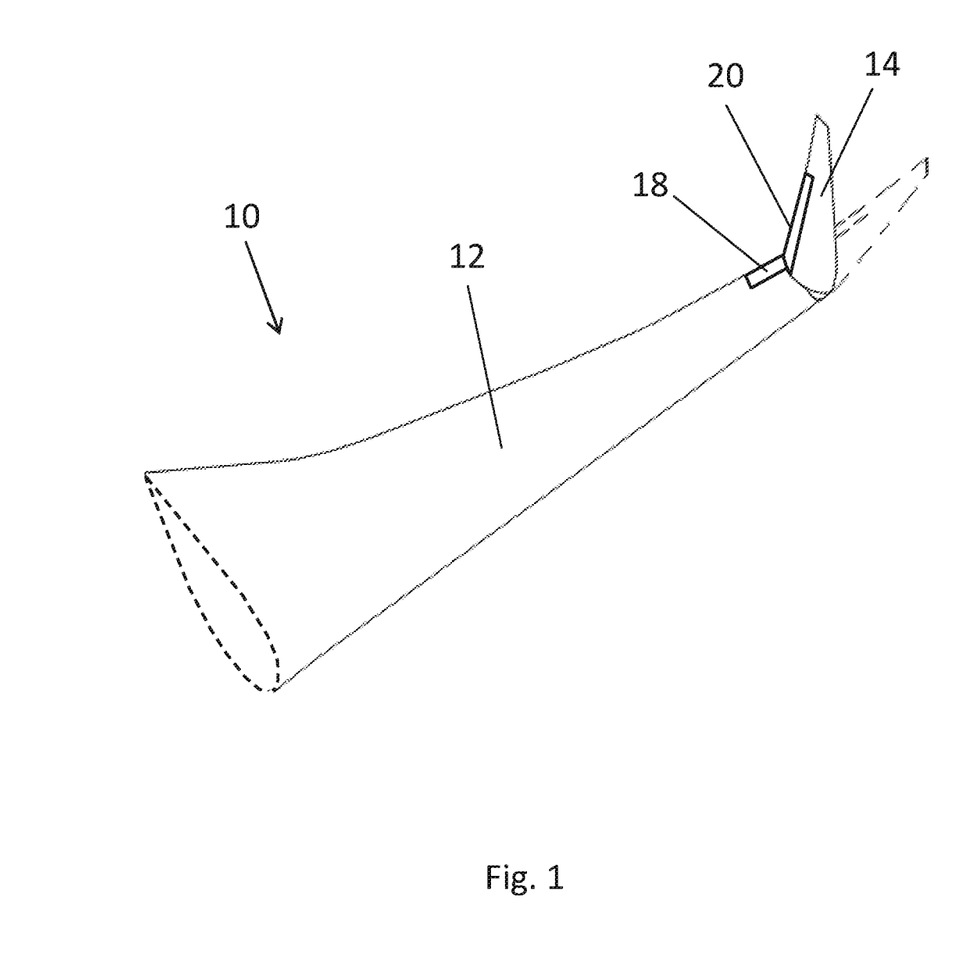
FIG. 1 shows a perspective view of a swept wing of a passenger aircraft according to an embodiment of the invention, where a wing tip device of the wing is shown in a flight configuration (shown as dotted lines) and in a ground configuration (shown as solid lines)

FIG. 1 shows an aircraft wing 10 comprising a fixed wing 12, connected to the fuselage of an aircraft (not shown in FIG. 1) and a movable wing tip device 14. The movable wing tip device 14 is movable between a flight configuration, as shown by the broken lines, and a ground configuration, as shown by the solid lines. The span of the wing when the wing tip device is in the ground configuration is reduced compared to the span of the wing when the wing tip device is in the flight configuration.

Figure 2:
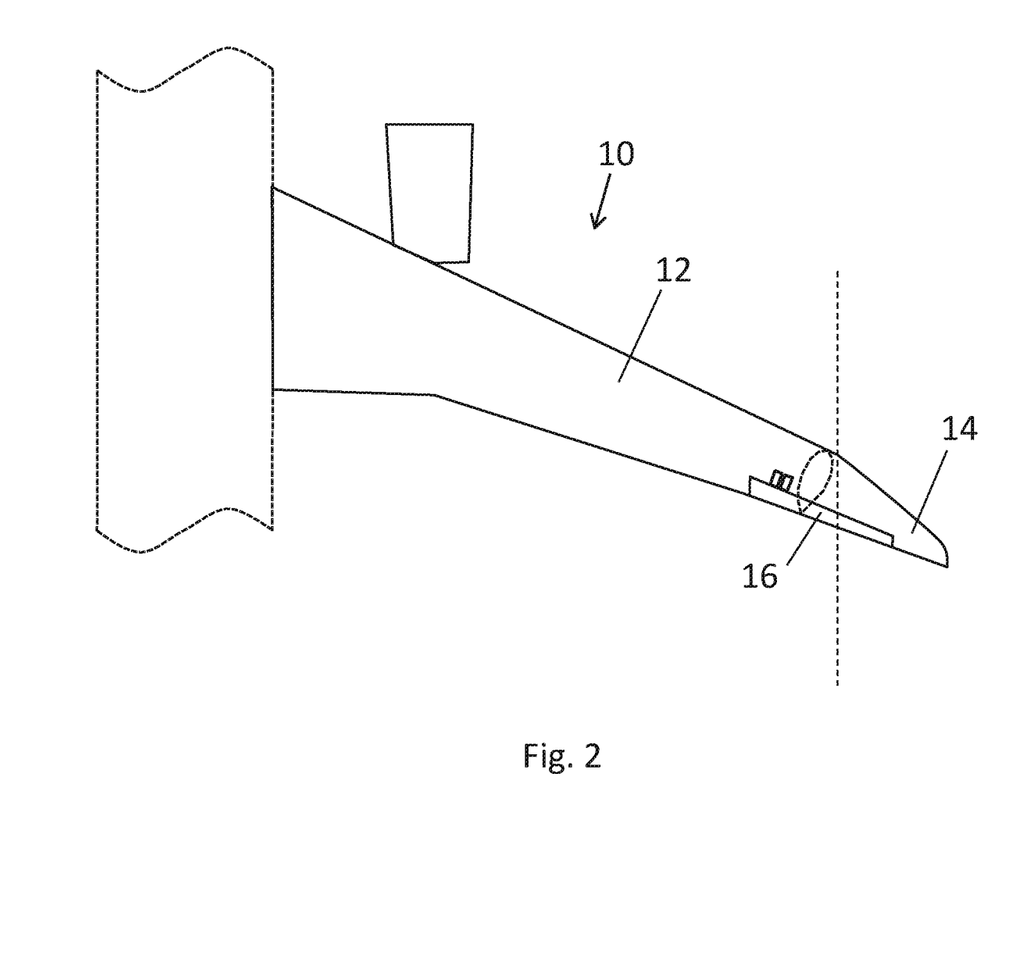
FIG. 2 shows a plan view of an aircraft wing according to a first embodiment of the invention.
Figure 3:
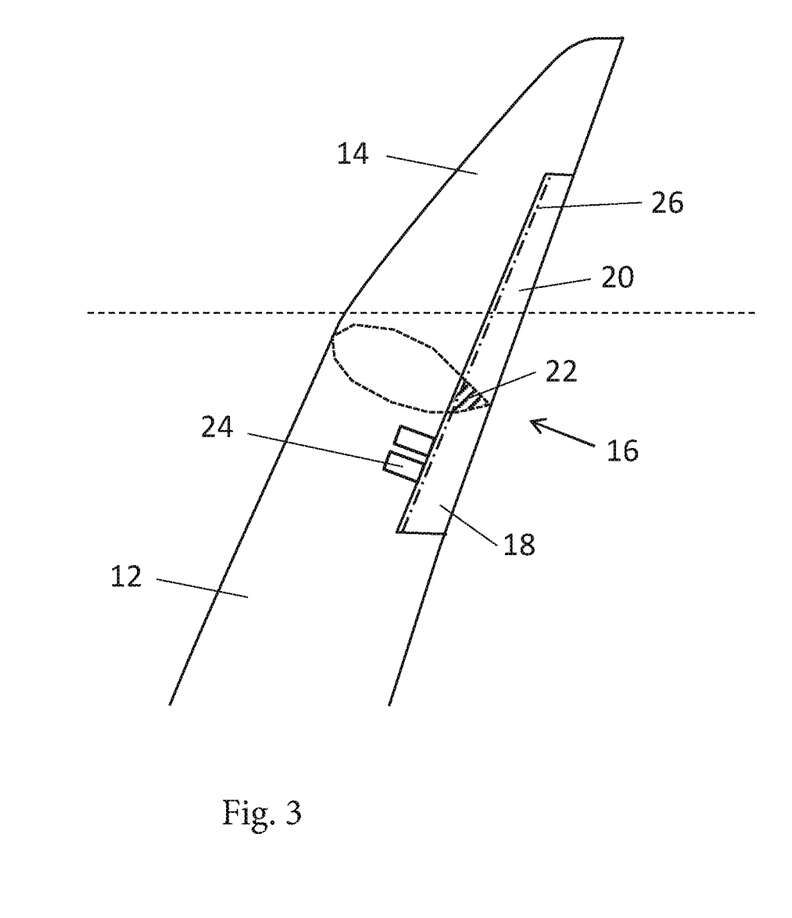
FIG. 3 shows an enlarged view of the end of the aircraft wing shown in FIG. 1.

FIGS. 2 and 3 show the aircraft wing 10 in more detail. The wing 10 comprises a two-part aileron 16 extending across from the fixed wing 12 to the wing tip device 14. The two-part aileron 16 comprises a master aileron 18 and a slave aileron 20. When in the flight configuration, as shown in FIGS. 2 and 3, there is an interface 22 between the master aileron 18 and slave aileron 20. Actuators 24 are arranged to move the master aileron 18 around an aileron hinge axis 26. The interface 22 is configured to provide a rigid connection such that movement of the master aileron 18 around the aileron hinge axis 26 is transferred to the slave aileron 20, causing the slave aileron 20 to move in the same way as the master aileron 18. Such an arrangement advantageously provides all of the actuators needed to move the master aileron 18 and slave aileron 20 on the fixed wing 12, removing the need to provide such actuators on the wing tip device 14. Thus the construction of the wing 10 may be simplified, whilst still providing a flight control surface on the wing tip device.

Figure 4:
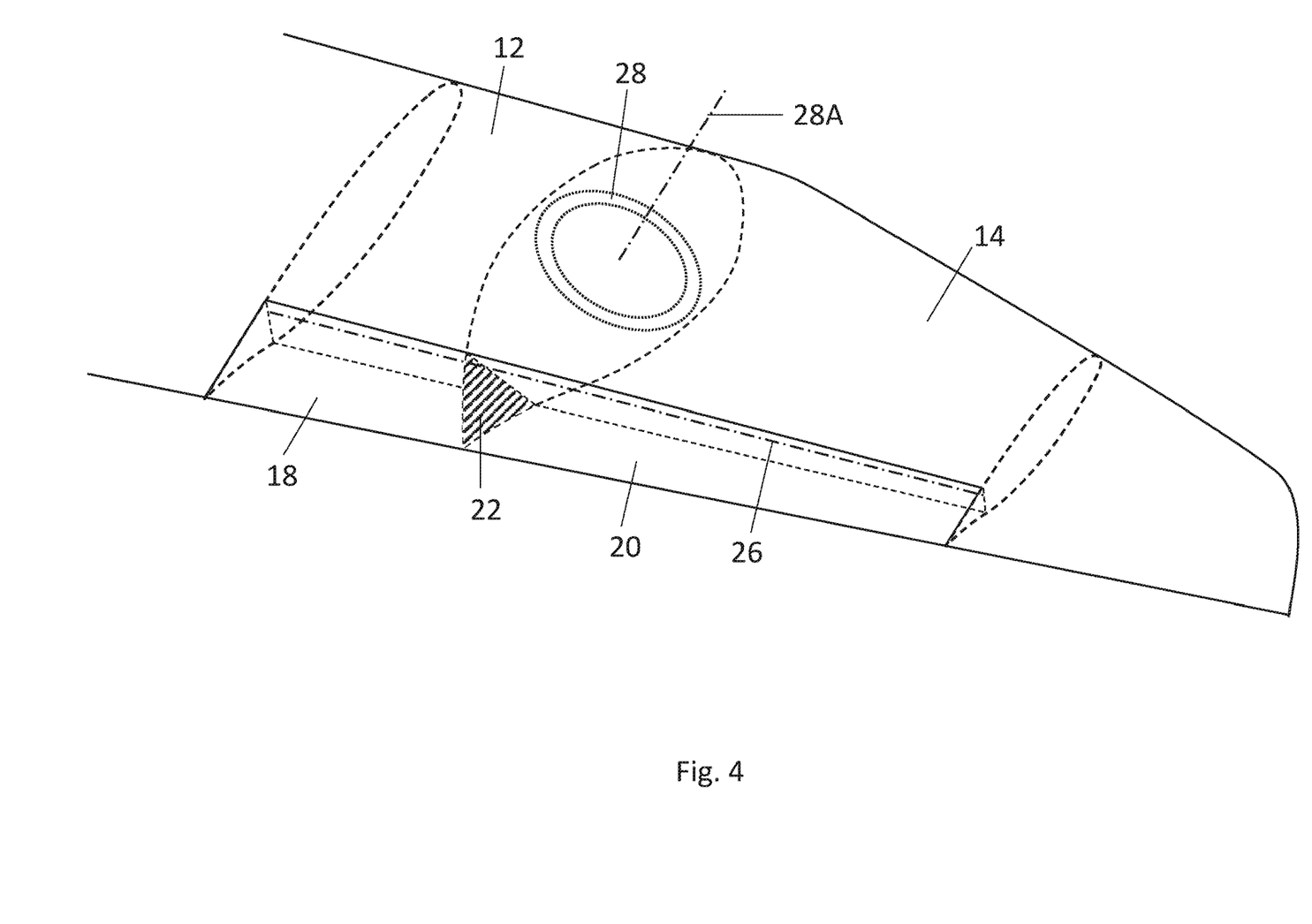
FIG. 4 shows a rotational wing tip mechanism which may be used with an embodiment of the present invention.

FIG. 4 shows the joint between the fixed wing 12 and the movable wing tip device 14 in more detail, with the various outer layers of the interface removed for ease of reference. The movable wing tip device 14 is movable between the flight configuration and ground configuration by rotational movement, about a rotational axis (shown as axis 28A in FIG. 5) that is perpendicular to a notional oblique cut plane between the fixed wing 12 and the wing tip device 14 when the wing tip device is in the flight configuration. An example of a wing tip device that is rotatable in this manner is shown in WO 2015/150835, the contents of which are incorporated herein by reference. As the skilled person will understand the kinematics of such an arrangement from this earlier publication, for the sake of brevity, a detailed explanation of the kinematics will not be replicated here.

Figure 5:
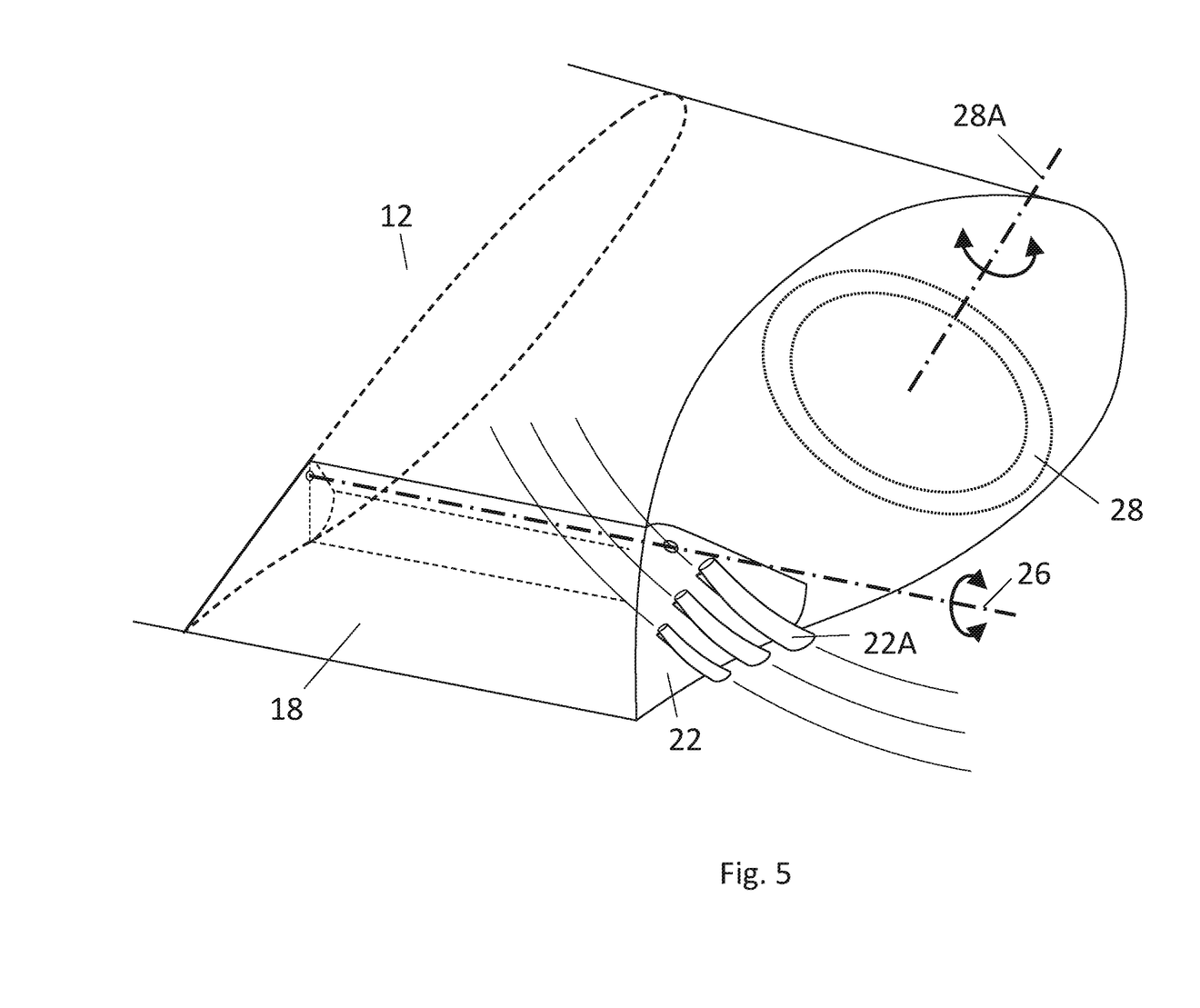
FIG. 5 shows one side of a possible interface of a master aileron.

FIG. 5 shows the end face of the fixed wing 12, with the wing tip device 14 removed for clarity. The fixed wing 12 includes a slew ring 28 with a rotational axis 28A, around which the wing tip device 14 moves when being actuated between the flight configuration and ground configuration. The master aileron 18 includes an end face with one half of the interface 22, shown as 22A. The interface 22A comprises a series of curved male formations, which form a circular arc with a centre coincident with the rotational axis 28A of the wing tip device 14. The slave aileron 20 comprises an interface 22B of a series of corresponding female formations (not shown in FIG. 5, but shown in FIGS. 7, 8, and 9) which are free to move with respect to the male formations when the wing tip device is being rotated around the axis 28A, between the flight configuration and ground configuration. However, the male formations and female formations, when the wing tip device 14 is in the flight configuration, are oriented such that movement of the master aileron 18 around the aileron axis 26 (which is non-parallel to the axis 28A of the wing tip device 14) causes the formations to interlock. Therefore, movement of the master aileron 18 around the aileron axis 26 causes a corresponding movement of the slave aileron 20 around the aileron axis 26.

Figure 6:
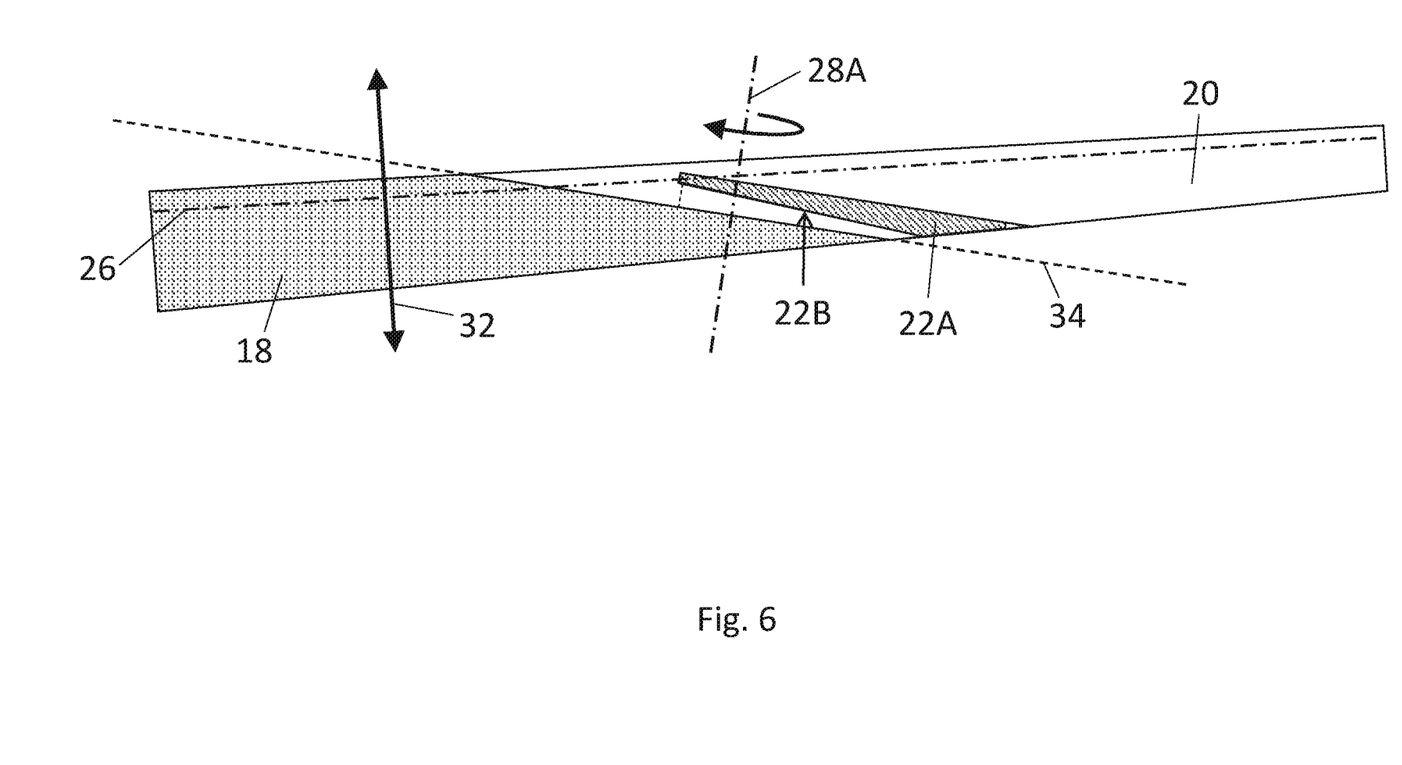
FIGS. 6, 7, and 8, show a cross-sectional view of a possible aileron configuration for use with an embodiment of the present invention.
Figure 7:
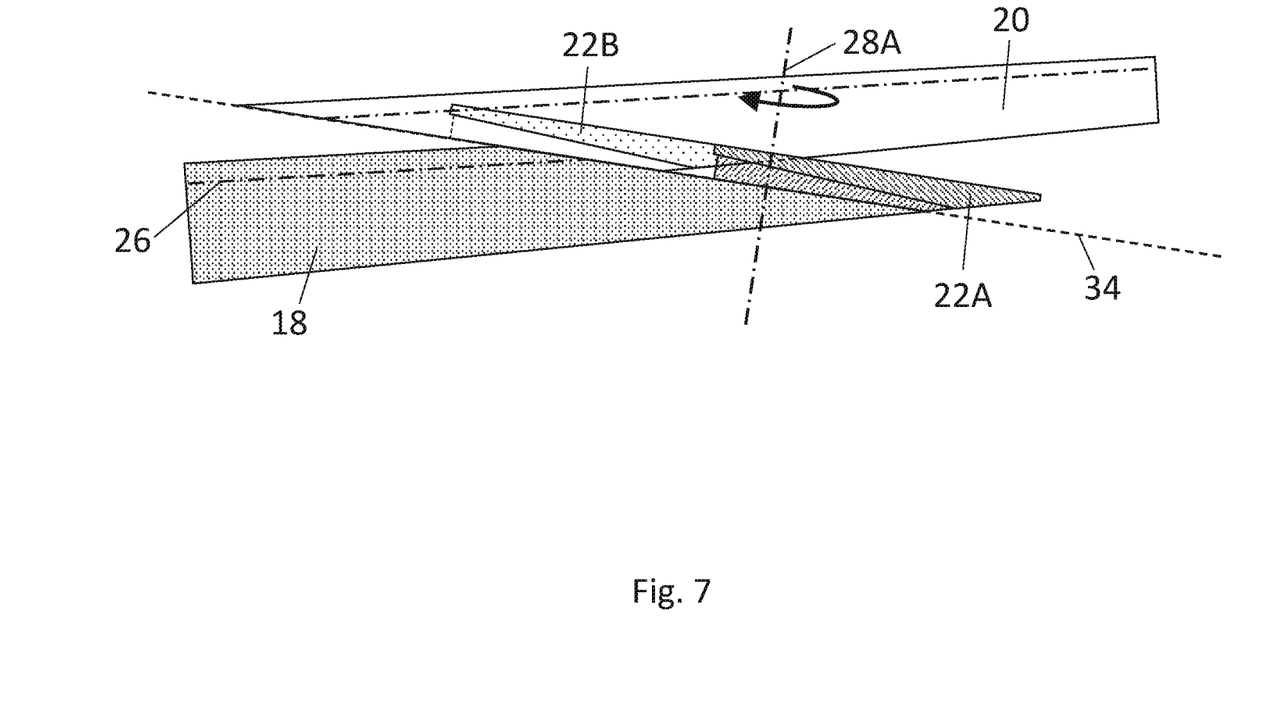
Figure 8:
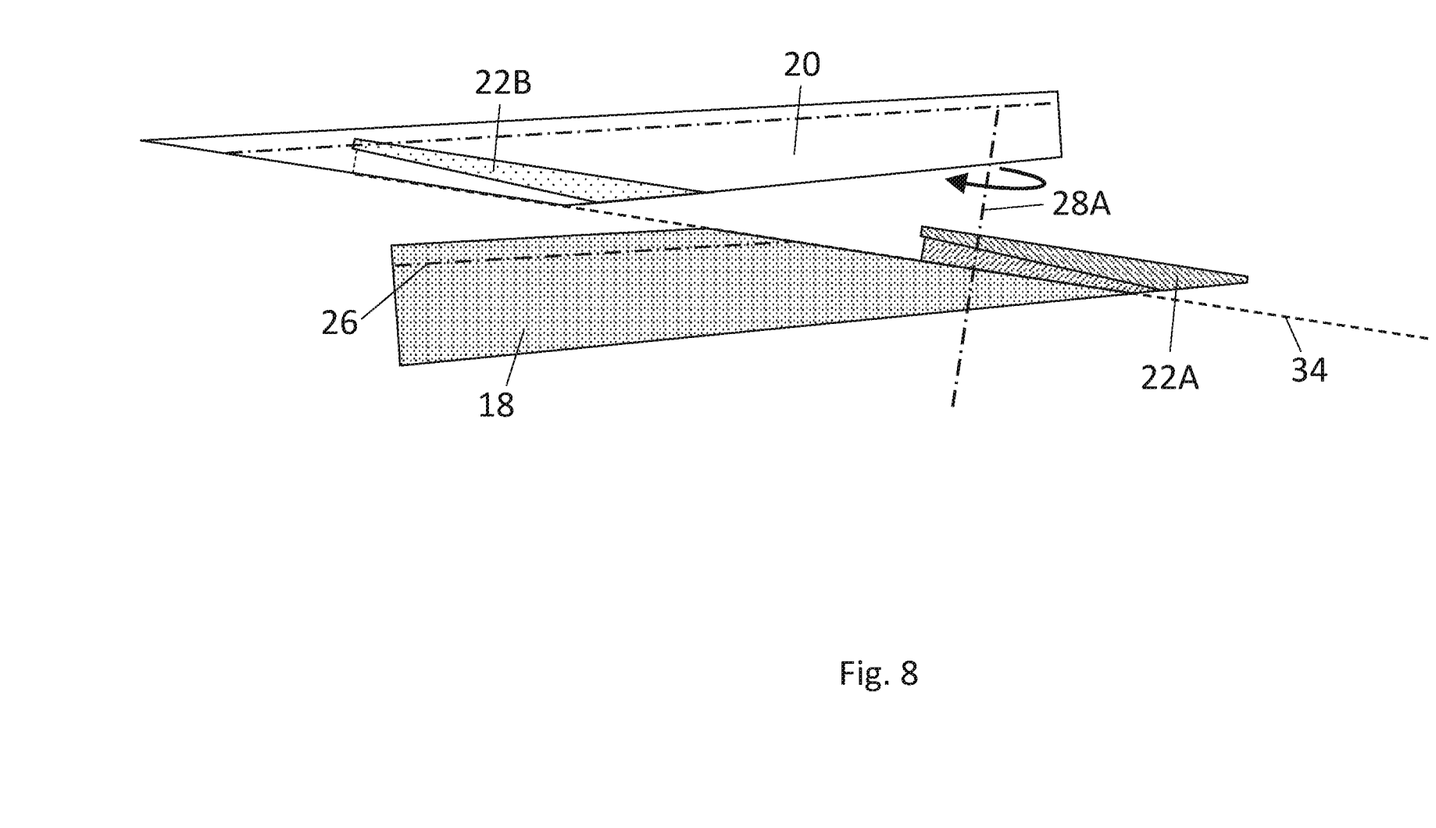
Figure 9:
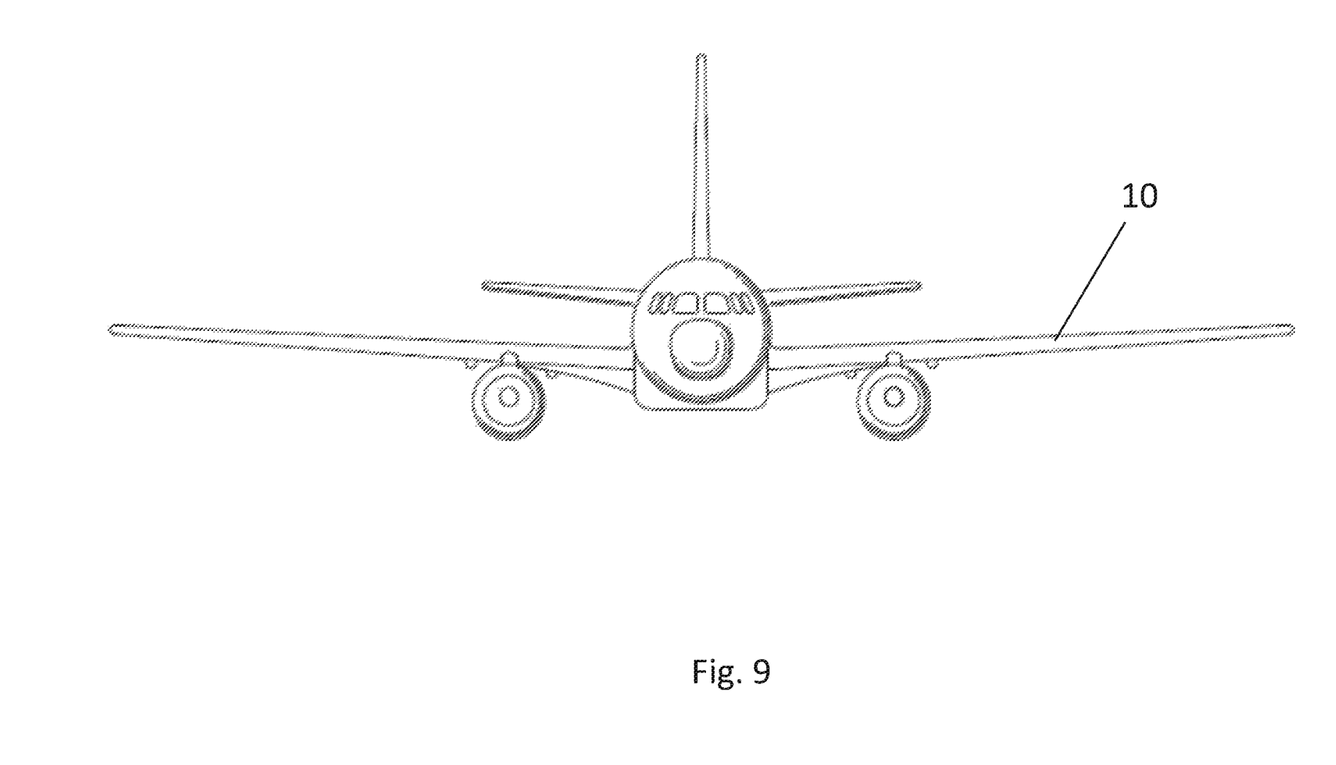
FIG. 9 shows an aircraft according to an embodiment of the invention

FIGS. 6, 7, and 8, show a cross sectional view of the master aileron 18 and the slave aileron 20 moving between the wing tip device being in the flight configuration and ground configuration. FIG. 6 shows the wing tip device 14 being in the flight configuration, and the interface 22A and 22B fully interlocked. The arrow 32 shows the direction of allowable movement of the master aileron 18 (and hence also the slave aileron 20) around the aileron axis 26. The dashed line 34 indicates the plane of rotation of the wing tip device 14 as it moves between the flight configuration and ground configuration. FIG. 7 shows the initial movement of the wing tip device 14 towards the ground configuration. The interface 22A and 22B has partially decoupled, being free to move in the plane 34, around the rotational axis 28A. FIG. 8 shows the wing tip device 14 in the ground configuration, where the interface 22A and 22B has fully decoupled. Movement of the wing tip device 14 from the ground configuration to the flight configuration is simply the reverse of the above described process.

Whilst the present invention has been described and illustrated with reference to particular embodiments, it will be appreciated by those of ordinary skill in the art that the invention lends itself to many different variations not specifically illustrated herein. By way of example only, certain possible variations will now be described. For example, other interlock arrangements may be provided, which achieve the function of allowing rotation around one axis, but provide a rigid coupling effect when rotated around a different axis.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing, the aircraft wing comprising:
   a fixed wing;
   a wing tip device rotatably attached to of the fixed wing, wherein the wing tip device rotates about a pivot axis between: a flight configuration for use during flight, and a ground configuration for use during ground-based operations, in which the wing tip device rotates from the flight configuration to the ground configuration such that a span of the aircraft wing is reduced, and the pivot axis is oblique to a plane defined by a chord and span of the fixed wing;
   a master flight control surface associated with the fixed wing and a slave flight control surface associated with the wing tip device;
   an interface spanning between and physically connecting the master flight control surface and the slave flight control surface, wherein the interface forms a rigid connection between the master flight control surface and slave flight control surface when the wing tip device is in the flight configuration,
   wherein the master control surface and the slave flight control surface both move about a control axis common to both of the master flight control surface while the wing tip device is in the flight configuration and the interface forms the rigid connection, and
   wherein the interface is arranged such that the slave flight control surface decouples from the master flight control surface when the wing tip device is moved from the flight configuration into the ground configuration.

2. The aircraft wing as claimed in claim 1, wherein the flight control surfaces are located at a trailing edge of the wing.

3. The aircraft wing as claimed in claim 1, wherein the flight control surfaces are ailerons.

4. The aircraft wing as claimed in claim 1, wherein the flight control surfaces are located at a leading edge of the wing.

5. The aircraft wing as claimed in claim 1, wherein the flight control surfaces are slats or flaps.

6. The aircraft wing as claimed in claim 1, wherein the interface between the master flight control surface and slave flight control surface is a passive interface.

7. The aircraft wing as claimed in claim 1, wherein the interface is formed by a series of grooves, protrusions, or formations on the master flight control surface and slave flight control surface inter-engaging when the wing tip device is in the flight configuration.

8. The aircraft wing as claimed in claim 7, wherein movement of the wing tip device from the flight configuration to the ground configuration results in the series of grooves, protrusions, or formations disengaging.

9. The aircraft wing as claimed in claim 1, wherein the fixed wing may comprise one or more actuators associated with the master flight control surface.

10. The aircraft wing as claimed in claim 1, wherein the wing tip device and the fixed wing are separable along an oblique cut plane passing through the upper and lower surfaces of the wing, the oblique cut plane is orientated normal to an axis of rotation of the wing tip device.

11. An aircraft wing as claimed in claim 10, wherein the interface between the master flight control surface and the slave flight control surface is located in the oblique cut plane.

12. An aircraft, the aircraft comprising a wing as claimed in claim 1.

13. An aircraft wing comprising:
    a fixed wing;
    a wing tip device coupled to a tip of the fixed wing by an interface;
    a slew ring interface coupling the wing tip device to the fixed wing, wherein a pivot axis of the slew ring interface is oblique to a plane defined by a chord and span of the fixed wing and the wing tip device rotates about the pivot axis;
    a master flight control surface connected to the fixed wing, and configured to move with respect to the fixed wing along a first direction;
    a slave flight control surface connected to the wing tip device and configured to move with respect to the wing tip device along the first direction; and
    a male and female assembly interface between a first end of the master flight control surface and a second end of the slave flight control surface,
    wherein the interface includes a male member attached to one of the first or second ends and a female member attached to the other of the first or second ends, wherein the male member has a curved shape and the curved shape has radial center at the pivot axis;
    wherein the male member is configured to slide into and out of the female member as the wing tip device turns about the pivot axis, and
    wherein the slave flight control surface is locked to the master flight control surface at the interface while the male member is in the female member.

14. The aircraft wing of claim 13 further comprising an actuator attached to the fixed wing and connected to the master flight control surface, wherein the actuator is configured to move the master flight control surface in the first direction and the slave flight control surface moves with the master flight control surface due to a locked relationship between the master flight control surface and the slave flight control surface.

15. The aircraft wing of claim 13 wherein the male member is a plurality of curved bars arranged in a plane perpendicular to the pivot axis and each of the curved bars has a curvature centered on the pivot axis.

16. The aircraft wing of claim 15 wherein the curved bars are mounted above an end surface of the tip of the fixed wing, wherein the end surface is in a plane perpendicular to the pivot axis and the plane of the curved bars is offset from the plane of the end surface.

17. The aircraft wing of claim 13 wherein the master flight control surface and the slave flight control surface form an aileron at trailing edges of the fixed wing and the wing tip device.

18. The aircraft wing of claim 13 wherein the master flight control surface and the slave flight control surface are mounted, respectively, to leading edges of the fixed wing and the wing tip device.

19. The aircraft wing of claim 13 wherein the first direction is parallel to a chord of the fixed wing.

20. The aircraft wing of claim 1, wherein the interface includes a male formation extending from one of the master and slave flight control surfaces and a female formation on the other of the slave and master flight control surfaces, wherein the male formation is received by the female formation in the flight configuration and wherein the male formation moves out of the female formation as the slave flight control surface decouples from the master flight control surface.

* * * * *